April 2, 1957
P. E. MILLER
2,787,074
WILDFOWL DECOY MOUNT

Filed Dec. 7, 1955
2 Sheets-Sheet 1

PAUL E. MILLER  INVENTOR

BY *David L. Farley, Jr.*
ATTORNEY

April 2, 1957   P. E. MILLER   2,787,074
WILDFOWL DECOY MOUNT
Filed Dec. 7, 1955   2 Sheets-Sheet 2

PAUL E. MILLER   INVENTOR

BY David L. Farley, Jr.
ATTORNEY

United States Patent Office 2,787,074
Patented Apr. 2, 1957

2,787,074
WILDFOWL DECOY MOUNT
Paul E. Miller, Richmond, Va.
Application December 7, 1955, Serial No. 551,615
3 Claims. (Cl. 43—3)

This invention relates to an improved form of mount for a wildfowl decoy which is adapted to consecutively assume a partially erect position and then flap its wings. Essentially, this decoy mount comprises a ball joint attached to a decoy body, with a shaft attached to the ball of the joint and pivotably supporting the body.

This application is a continuation-in-part of application, Serial Number 443,528, filed by this applicant on July 15, 1954, which issued as Patent No. 2,752,715 for "Animated Wildfowl Decoy."

A primary object of this invention is to provide a decoy mount that allows the decoy to pivot and assume a partially upright position with its head raised, or to pivot in various directions, with maximum ease and naturalness so as to simulate the motions of a wildfowl flapping its wings to stretch them or shake the water off of them.

Another object of this invention is to provide a decoy mount that can permit the decoy to wobble in various directions to simulate the bobbing motions of a wildfowl floating on water.

A further object of this invention is to provide a decoy mount and anchoring means that can hold the decoy at substantially the same location in rough tidal waters yet allow the decoy to rise and fall with the tide and shift its position to conform with the direction of the wind and waves.

An advantageous embodiment of this invention is described below, by way of example, with reference to the accompanying drawings, in which.

Figure 1:
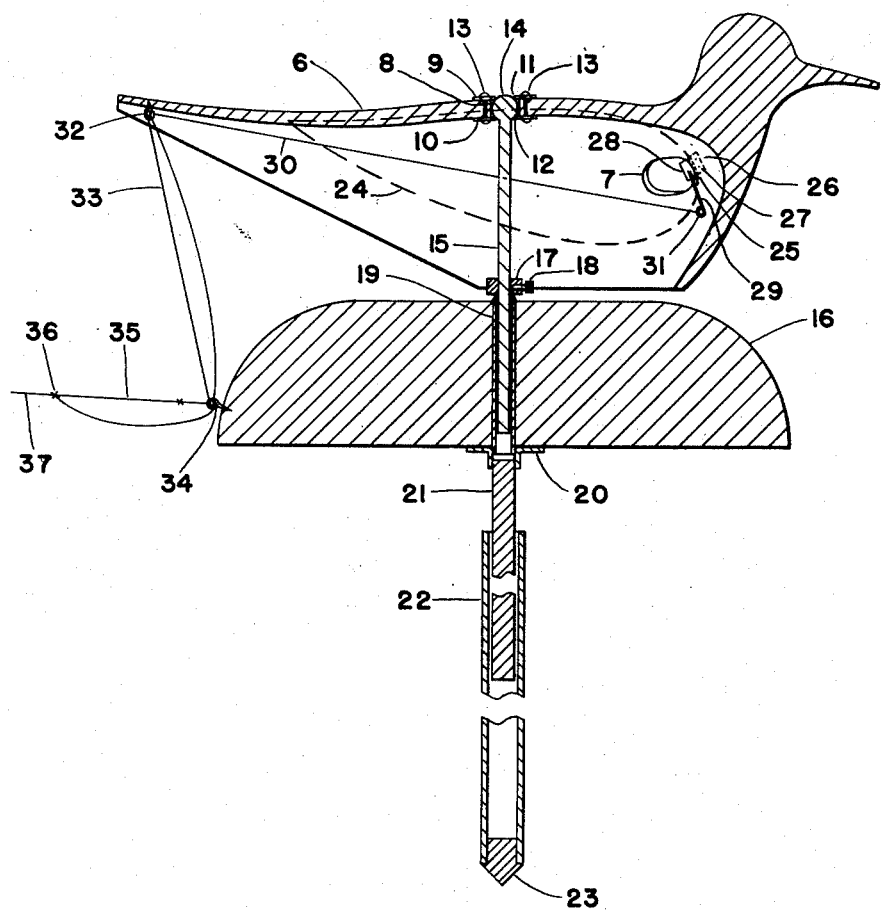
Fig. 1 is a transverse sectional view of a decoy mount constructed according to this invention and shown resting in a horizontal position.
Figure 2:
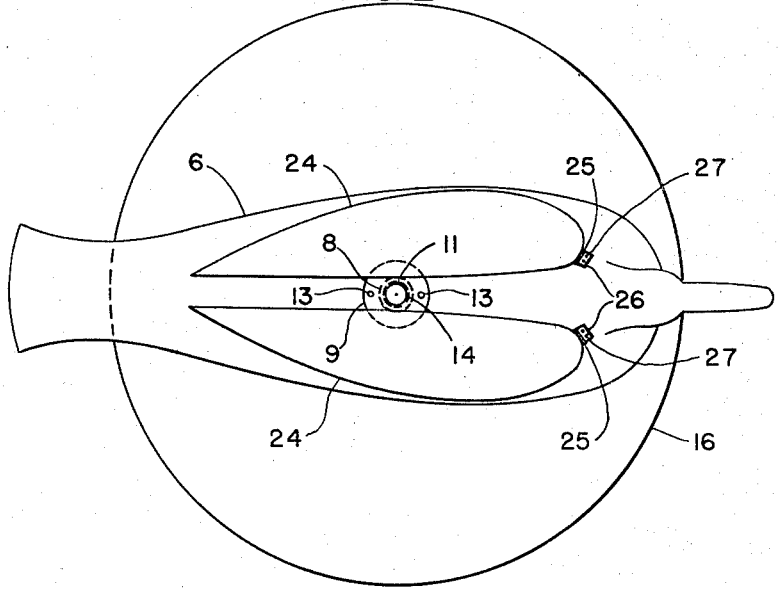
Fig. 2 is a plan of the decoy of Fig. 1 in rest position.

In the drawings the body 6 of the decoy is partly hollow, is open at its bottom and has an opening 7 on each side. It may be made from wood, light metal, such as aluminum stampings, or plastic. A socket opening 8 extends through the back of the decoy body 6 and is partially closed at both its ends by an exterior washer 9 and an interior washer 10. The washers 9 and 10 have washer openings 11 and 12, respectively, and are fastened in place by rivets or bolts 13. The washer openings 11 and 12, advantageously but not necessarily, are aligned substantially with the vertical gravitational axis of the body 6 and decoy structure.

A spherical enlargement or ball 14, somewhat larger than the openings 11 and 12 in the washers 9 and 10, is located inside the socket opening 8 between the washers 9 and 10 with its surface in contact with the interior edges of the washer openings 11 and 12. A support shaft 15 is attached to ball 14, as an integral part thereof or by welding or brazing or by some other conventional attachment means. The support shaft 15 extends down through the opening 12 in interior washer 10. The lower end of support shaft 15 can be embedded directly in the bottom of a pond or stream to support the decoy body 6, or, advantageously, is mounted upon a water buoyant base 16 to support the decoy body 6 at the desired level.

Thus, the opening 8 partially enclosed by washers 9 and 10 serves as a socket for ball 14 and forms a ball joint means therewith which permits the decoy body 6 to pivot freely in various directions. Preferably, this ball joint means is attached to the decoy body at a point above the horizontal center of gravity of the decoy structure. Other conventional forms of ball and socket joint means known to the art may also be employed in place of the particular arrangement described here by way of illustration.

A collar 17 fits loosely around the support shaft 15, so as to be slidable therealong, and may be locked in position at any desired point along the shaft 15 by a set screw 18. Advantageously, support shaft 15 is mounted upon the water buoyant base 16 by inserting the lower portion of the shaft into a support pipe 19 which is frictionally or press fitted into the base 16 in a substantially vertical position. The lower surface of the collar 17 and the upper surface of the support pipe 19 serve as bearing surfaces. The diameter of the bore of the pipe 19 is slightly larger than the diameter of the support shaft 15 so that the shaft fits loosely therein. The lower portion of pipe 19 projects down below the bottom of the base 16 and is threaded on its exterior to be received into an interiorly threaded flange 20, the upper portion of which is screwed thereon.

An anchor rod 21, threaded on the surface of its upper portion, is screwed into the lower portion of the interiorly threaded flange 20.

The lower portion of the anchor rod 21 fits loosely into the bore of an anchor pipe 22 whose lower end is closed by a pointed wooden plug 23 frictionally fitted into the lower end of the anchor pipe 22. The pointed end of the wooden plug 23 projects downward so that the plugged anchor pipe 22 may be easily embedded in the bottom of a pond or stream.

The above described mount is designed to cooperate with various forms of decoys, known to the art, which are adapted to assume a partially erect position and flap their wings. In an advantageous form of such decoy, substantially as described in application Serial Number 443,528, filed by this applicant on July 15, 1954, which issued as Patent No. 2,752,715 for "Animated Wildfowl Decoy," a pair of wing members 24 are pivotally attached to opposite sides of the decoy body 6 in corresponding positions by a pair of hinges 25. Each hinge has its forward leaf 26 rigidly fastened by screws 27 to the exterior surface of the decoy body at a point just below the neck of the body and just above and on the edge of the opening 7. The rearward movable leaf 28 of each one of the corresponding two hinges 25 is fastened to the interior surface of the forward edge of one of the two wing members 24. Thus, the axis of each hinge 25 is positioned on a bias, or obliquely relative to the longitudinal axis of the body 6, and the wing members 24 may be pivoted about such hinge joints 25.

Each rearward leaf 28 has a lever arm 29 attached to its inner surface. Each lever arm 29 extends down through the adjacent opening 7 and into the hollow interior of the decoy body substantially perpendicular to the plane of the wing member 24, or, advantageously, forward into the hollow interior of the decoy body toward the head end of the body, as long as the wing members 24 are disposed in rest position along respective sides of the body.

A wing pull means such as fine diameter wing cord 30 is attached to the inner end 31 of each lever arm 29 and extends back through the interior of the body 6 to the rear of the body and from thence to the outside. Such cords pass through a first bracket 32 which is attached to the body under its tail. A body pull means such as cord 33 is attached to the bracket 32. Both the wing cord 30 and the body cord 33 pass down through a second bracket 34 which is fastened to the buoyant base 16, and from thence to the rear. A spring 35 of elastic construction, preferably a rubber band, is connected to the body cord 33 and extends back to a junction point 36 outside and to the rear of body 6 where it is attached to the wing cords 30. The combined length of the body cord 33 and the unextended spring 35 is substantially less than the length of each wing cord from its point of attachment to one of the two wing-operating lever arms 29 back to the junction point 36. Therefore, there is considerable slack in the pair of wing cords 30. A master cord 37 is attached to the body and wing cords at their junction point 36 and extends back to the hunter in his blind or other place of concealment.

Figure 3:
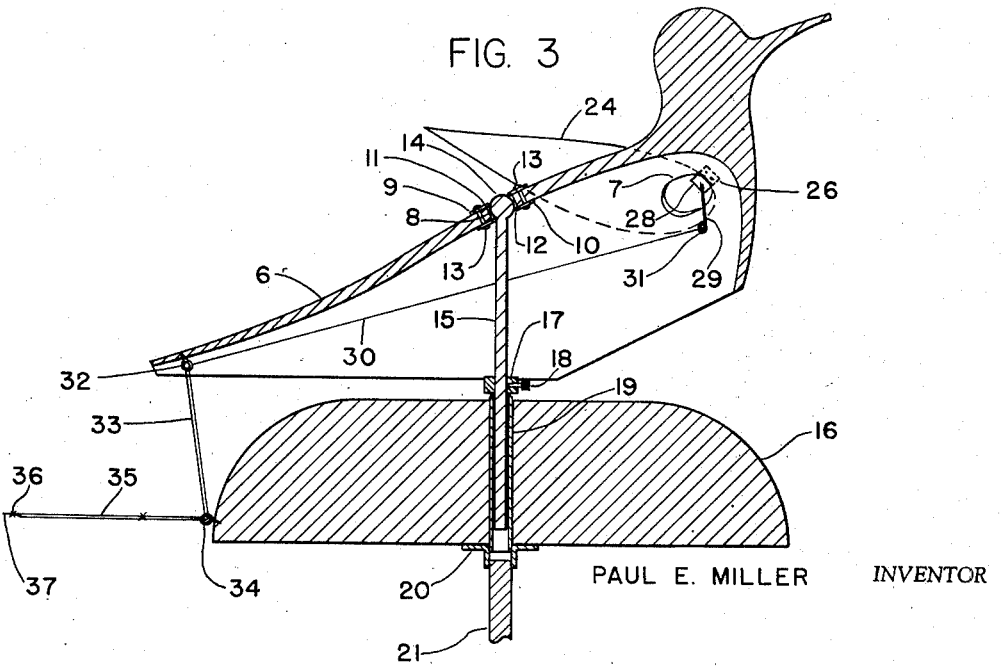
Fig. 3 is a transverse sectional view of the decoy of Fig. 1 shown pivoted back with its head raised and wings extended.

In operation, the master cord 37 is pulled by the hunter, thereby placing the spring 35 and the body cord 33 under tension and causing the body 6 of the decoy to pivot backwards about the ball 14 in the ball joint. Thus, the decoy assumes the partially erect position shown in Fig. 3. Further tension from pull on the master cord 37 stretches the spring 35 and the resulting elongation takes up the slack in the wing cords 30. These cords, in turn, pull the lever arms 29 back and cause the wing members 24 to rise forward and upward as they pivot about the axes of the hinges 25. Upon release of the master cord 37 gravity will cause the wing members to fall back against the body and the body to return to a rest position.

The collar 17 may be locked on the support shaft 15 by set screw 18 in a position that stabilizes the decoy in a substantially horizontal rest position, when the master cord 37 is not being pulled. Or, collar 17 may be raised and locked in a position that spaces the bottom of the decoy from the upper surface of the base and permits the decoy to wobble freely and pivot about the ball 14 in response to the actions of the wind and waves when the master cord 37 is not being pulled upon. The latter adjustment will allow the decoy to simulate more closely the bobbing motions of a wildfowl floating on water. The ball joint permits the decoy to pivot very easily thereabout in various directions.

In tidal or rough waters the anchor pipe 22 may be embedded in the bottom of the stream or pond and the decoy permitted to rise and fall in response to changes in the water level as the anchor rod 21 slides up and down in the anchor pipe 22.

While the most advantageous known form of this invention has been illustrated in the drawings and described herein, it is to be understood that such is merely by way of example and that other forms, modifications and equivalents may be designed within the scope of the invention as defined in the appended claims.

Having thus described my invention, I claim:

1. A fowl decoy adapted to assume a partially erect position and flap its wings comprising a decoy body, ball joint means attached to said body, a support shaft attached to the ball in said ball joint means and pivotably supporting said body, a pair of wing members each pivotably connected to said body, lever means attached to said wing members, substantially inelastic wing pull means attached to said lever means, and elastic body pull means attached to said body, said wing pull means being joined to and slack relative to said body pull means, whereby when said wing pull means are pulled said body pull means will first cause said body to pivot and will then stretch to take up the slack in said wing pull means which will then by further pulling cause said wing members to be flapped by said lever means.

2. A fowl decoy adapted to assume a partially erect position, and flap its wings comprising a decoy body, ball joint means attached to said body, a support shaft attached to the ball in said ball joint means and pivotably supporting said body, a water buoyant base with said support shaft mounted thereon, a pair of wing members each pivotably connected to said body, lever means attached to said wing members, substantially inelastic wing pull means attached to said lever means, and elastic body pull means attached to said body, said wing pull means being joined to and slack relative to said body pull means, whereby when said wing pull means are pulled said body pull means will first cause said body to pivot and will then stretch to take up the slack in said wing pull means which will then by further pulling cause said wing members to be flapped by said lever means.

3. A fowl decoy adapted to assume a partially erect position and flap its wings comprising a decoy body, ball joint means attached to said body, a support shaft attached to the ball in said ball joint means and pivotably supporting said body, a water buoyant base with said support shaft mounted thereon and vertically adjustable therefrom, an anchor rod attached to and extending down from said base, an anchor pipe adapted to slidably receive the lower portion of said anchor rod, a pair of wing members each pivotably connected to said body, lever means attached to said wing members, substantially inelastic wing pull means attached to said lever means, and elastic body pull means attached to said body, said wing pull means being joined to and slack relative to said body pull means, whereby when said wing pull means are pulled said body pull means will first cause said body to pivot and will then stretch to take up the slack in said wing pull means which will then by further pulling cause said wing members to be flapped by said lever means.

References Cited in the file of this patent

UNITED STATES PATENTS

| | | |
|---|---|---|
| 740,293 | Loeble | Sept. 29, 1903 |
| 1,831,286 | Chelini | Nov. 10, 1931 |
| 2,192,375 | Goodale | Mar. 5, 1940 |